(12) United States Patent
Liu et al.

(10) Patent No.: US 8,027,175 B2
(45) Date of Patent: Sep. 27, 2011

(54) POWER SUPPLY ADJUSTING APPARATUS

(75) Inventors: Zhihua Liu, Shenzhen (CN); Xujun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/689,649

(22) Filed: Jan. 19, 2010

(65) Prior Publication Data

US 2010/0118567 A1    May 13, 2010

Related U.S. Application Data

(63) Continuation of application No. PCT/CN2008/071423, filed on Jun. 24, 2008.

(30) Foreign Application Priority Data

Jul. 18, 2007   (CN) .......................... 2007 1 0119236

(51) Int. Cl.
*H02M 3/335* (2006.01)
*H02M 1/12* (2006.01)
(52) U.S. Cl. ................................ 363/16; 363/17; 363/41
(58) Field of Classification Search .............. 363/34–48, 363/15–21.18
See application file for complete search history.

(56) References Cited

U.S. PATENT DOCUMENTS

| | | | |
|---|---|---|---|
| 5,517,154 A | 5/1996 | Baker et al. | |
| 6,091,612 A | 7/2000 | Blankenship | |
| 6,246,592 B1 | 6/2001 | Balogh et al. | |
| 6,281,666 B1 | 8/2001 | Tressler et al. | |
| 7,110,265 B2* | 9/2006 | Liu et al. | ........................ 363/16 |
| 7,230,405 B2* | 6/2007 | Jang et al. | ..................... 323/222 |
| 7,760,522 B2* | 7/2010 | Nobiki et al. | .................... 363/25 |
| 2006/0213890 A1* | 9/2006 | Kooken et al. | ........... 219/130.21 |
| 2007/0013440 A1* | 1/2007 | Chen et al. | ........................ 330/9 |

FOREIGN PATENT DOCUMENTS

| | | |
|---|---|---|
| CN | 1093499 A | 10/1994 |
| CN | 1139213 A | 1/1997 |
| CN | 1451201 A | 10/2003 |
| CN | 2834005 Y | 11/2006 |
| EP | 0 608 788 A1 | 1/1994 |

(Continued)

OTHER PUBLICATIONS

Third Office Action (with partial translation) issued in corresponding Chinese Patent Application No. 200710119236.7, mailed Jul. 27, 2010. 9 pages.

(Continued)

*Primary Examiner* — Jessica Han
(74) *Attorney, Agent, or Firm* — Brinks Hofer Gilson & Lione

(57) ABSTRACT

A power supply adjusting apparatus includes a primary isolation converting unit, adapted to convert voltage or current of an input power supply signal and output a power supply signal that meets an expected voltage or current requirement. The power supply adjusting apparatus also includes a voltage adjustment controlling unit, adapted to output an adjustment control signal with respect to the output voltage according to an expected output voltage and a tracked signal provided by a powered apparatus. Further, the power supply adjusting apparatus includes a secondary non-isolation adjusting and converting unit, adapted to convert the power supply signal outputted by the primary isolation converting unit to an expected voltage according to the adjustment control signal outputted by the voltage adjustment controlling unit and output the adjusted power supply signal.

7 Claims, 13 Drawing Sheets

FOREIGN PATENT DOCUMENTS

| | | |
|---|---|---|
| EP | 1 521 353 A2 | 4/2005 |
| EP | 1 526 631 A1 | 4/2005 |
| EP | 1 704 954 A1 | 9/2006 |
| JP | 10-285923 A | 10/1998 |
| JP | 2005-39975 A | 2/2005 |
| WO | 2006/021790 A1 | 3/2006 |

OTHER PUBLICATIONS

International Search Report issued in corresponding PCT Application No. PCT/CN2008/071423; issued Aug. 15, 2008.

Office Action issued in Chinese Patent Application No. 2007101192367.

Supplementary European Search Report issued in corresponding European Patent Application No. 08 757 832.4; issued Jul. 5, 2010.

Written Opinion of the International Searching Authority issued in corresponding PCT Application No. PCT/CN2008/071423; mailed Sep. 25, 2008.

* cited by examiner

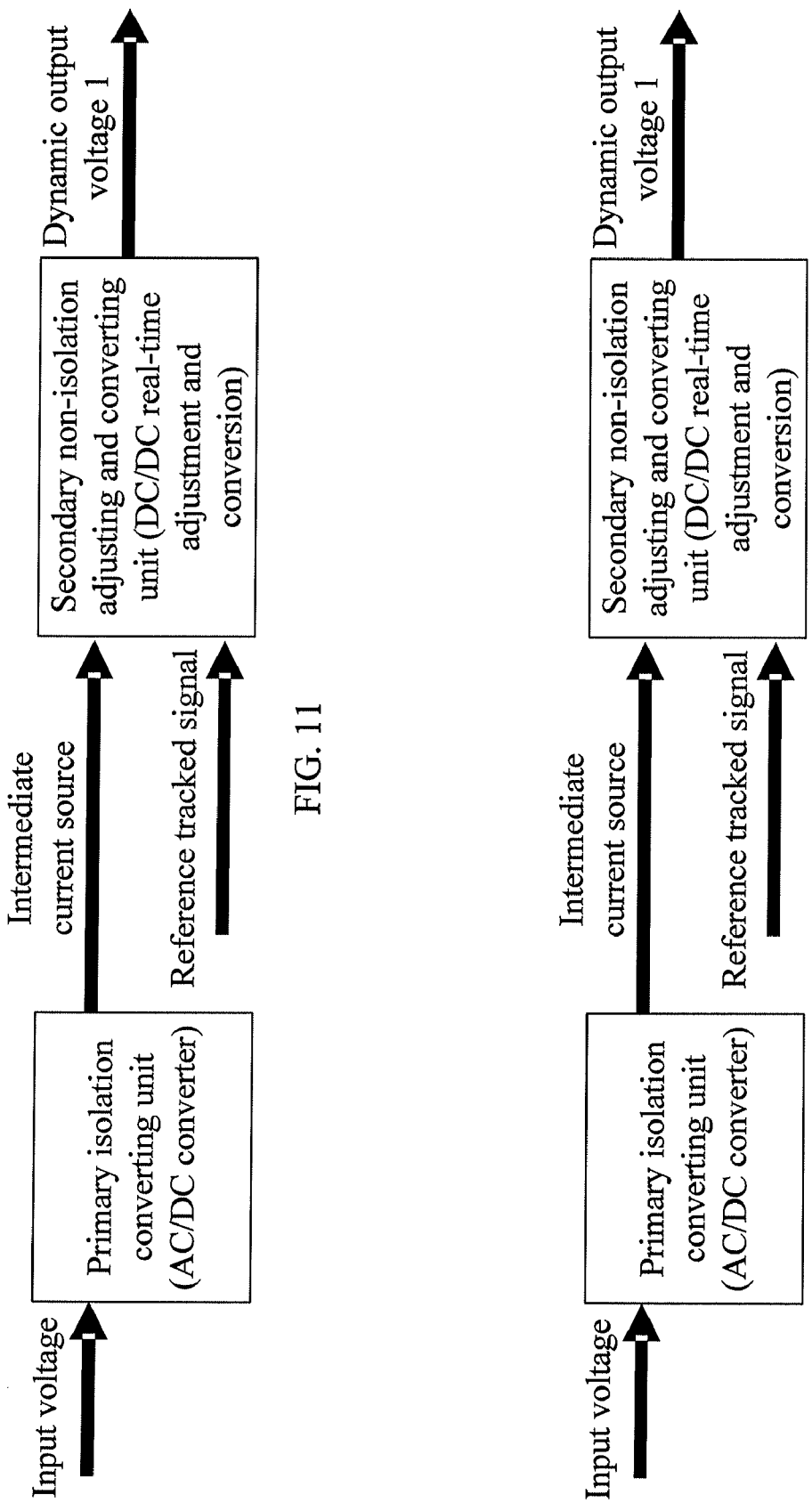

POWER SUPPLY ADJUSTING APPARATUS

CROSS-REFERENCE TO RELATED APPLICATIONS

This application is a continuation of International Application No. PCT/CN2008/071423, filed on Jun. 24, 2008, which claims priority to Chinese Patent Application No. 200710119236.7, filed on Jul. 18, 2007, both of which are hereby incorporated by reference in their entireties.

FIELD OF THE DISCLOSURE

The present disclosure relates to the supply of power to electronic devices, and in particular, to a power supply adjusting apparatus, a power supply isolating apparatus and a non-isolation adjusting and converting apparatus.

BACKGROUND

Transistor amplifiers which are often adopted in electronic devices reach their peak efficiency under specific input power. This power is related to the structure (circuit parts and layout), load condition and supply voltage. A typical electronic device, such as a radio frequency power amplifier (PA), is generally designed to achieve its optimal performance under the peak input signal. Because the dynamic bandwidth of the input signal of a PA is large, the input signal reaches the peak only occasionally so that the efficiency of a transistor linear PA is normally low.

A common solution for increasing the efficiency of a PA is based on the power supply with such techniques as Traffic Tracking (TT), Envelop Tracking (ET) and Envelope Elimination and Restoration (EER), where the drain supply voltage of the PA is dynamically changed according to the work requirements of the PA so as to increase the average system efficiency. In other similar scenarios, a power supply based solution may also be needed to improve the work efficiency of a system.

To implement the above power supply based solution, a Pulse Width Modulation (PWM) based method is adopted in the prior art so as to achieve an efficient voltage variable power supply.

In the prior art, a structure of a PWM based power supply adjusting apparatus applicable to a PA in a radio base station is shown in FIG. 1. The power supply adjusting apparatus includes an optional primary converting unit 101, an isolation adjusting and converting unit 102 and a feedback controller, where the input of the optional primary converting unit 101 or the isolation adjusting and converting unit 102 is connected to the input power supply, and the output of the primary converting unit 101 is connected to the isolation adjusting and converting unit 102, and the isolation adjusting and converting unit 102 is also connected to the feedback controller. The output power supply signal of the optional primary converting unit 101 or the isolation adjusting and converting unit 102 is adjusted according to a control signal of the feedback controller so as to obtain a variable output power supply and meet the power requirement of a powered apparatus. The isolation adjusting and converting unit 102 may be implemented by means of any closed-loop control, such as a half-bridge isolation conversion structure, a forward isolation conversion structure or a full-bridge isolation conversion structure. In the structure shown in FIG. 1, the closed-loop adjustment of the input voltage is implemented by controlling in real time the turn-on and turnoff of a switch tube on the primary side of the transformer of the isolation adjusting and converting unit 102. Due to the isolation of the primary side and the secondary side of the transformer, the control signal of the feedback controller requires the help of isolation units (isolation optical coupler and isolation transformer) for transfer.

Specifically, in FIG. 1, a variation in the output voltage Vo is sent to the voltage reference and loop compensation unit 104 on the secondary side of the transformer via the sampling unit 103 and then transferred to the primary side PWM controller integrated circuit (IC) and driving unit 106 via the isolation optical coupler 105. The PWM controller IC and driving unit 106 adjusts the output PWM pulse width in real time according to the variation in Vo so as to control the switch tube and rectifier diodes Q1 to Q8 in the power structure and achieve the purpose of a stable output voltage.

Because of the adoption of isolation feedback control, when the dynamic adjustment range of the output voltage is wide, the adjustment of the output voltage requires the real-time change of the work points of the isolation transformer and optical coupler so that the prior art has at least the following weaknesses:

1. During a process of wide-range and fast real-time voltage adjustment, the PWM needs to control the shutoff of Q3, Q4, Q5 and Q6 in real time, so that the magnetic induction intensity of the isolation transformer is relatively great and likely to exceed the saturated magnetic induction intensity of the isolation transformer. As a result, the isolation transformer is at risk of magnetic saturation and is likely to create audio noise so that the design of a transformer is more difficult.

2. Because of the delay induced by the inherent low-pass feature of such units as the voltage feedback isolation optical coupler, the need for fast dynamic voltage adjustment is even harder to meet by this power supply structure. When the output power changes quickly, due to the bandwidth limitation of the isolation optical coupler and the limitation of the work space of the transformer magnetic core, it is hard for the traditional voltage adjusted power supply to allow the application of high bandwidth signal tracking.

SUMMARY

Embodiments of the present disclosure provide a power supply adjusting apparatus for the purpose of fast dynamic voltage adjustment with respect to the tracking of a high bandwidth signal and reducing the complexity of a power supply adjusting apparatus.

A power supply adjusting apparatus includes:

a primary isolation converting unit, connected to an input of a power supply and adapted to: convert voltage or current of an input power supply signal and output a power supply signal that meets an expected voltage or current requirement;

a voltage adjustment controlling unit, adapted to: determine an adjustment control signal with respect to the output voltage according to an expected output voltage and a tracked signal provided by a powered apparatus and output the adjustment control signal; and a secondary non-isolation adjusting and converting unit, connected to an output of the power supply and adapted to: adjust the power supply signal outputted by the primary isolation converting unit according to the adjustment control signal outputted by the voltage adjustment controlling unit, and output an adjusted power supply signal.

A power supply isolating apparatus includes:

a primary isolation converting unit, adapted to: convert voltage or current of an input power supply signal, and output a power supply signal that meets an expected voltage or current requirement; and a power supply signal outputting unit, adapted to send the power supply signal obtained by the primary isolation converting unit to a non-isolation adjusting and converting apparatus.

A non-isolation adjusting and converting apparatus includes:

a power supply signal receiving unit, adapted to receive a power supply signal outputted by a power supply isolating apparatus; and a secondary non-isolation adjusting and converting unit, adapted to: adjust and convert the power supply signal according to an adjustment control signal from a voltage adjustment controlling unit, and output the adjusted power supply voltage signal.

According to the technical solution provided in the embodiments of the present disclosure, because the isolation optical coupler and isolation transformer are removed from the real-time dynamic adjustment controller, a high bandwidth power supply signal can be adjusted.

BRIEF DESCRIPTION OF THE DRAWINGS

FIG. 11 is a schematic diagram showing a third implementation structure of the apparatus according to an embodiment of the present disclosure;

FIG. 12 is a schematic diagram showing a fourth implementation structure of the apparatus according to an embodiment of the present disclosure;

DETAILED DESCRIPTION OF THE EMBODIMENTS

Figure 1:
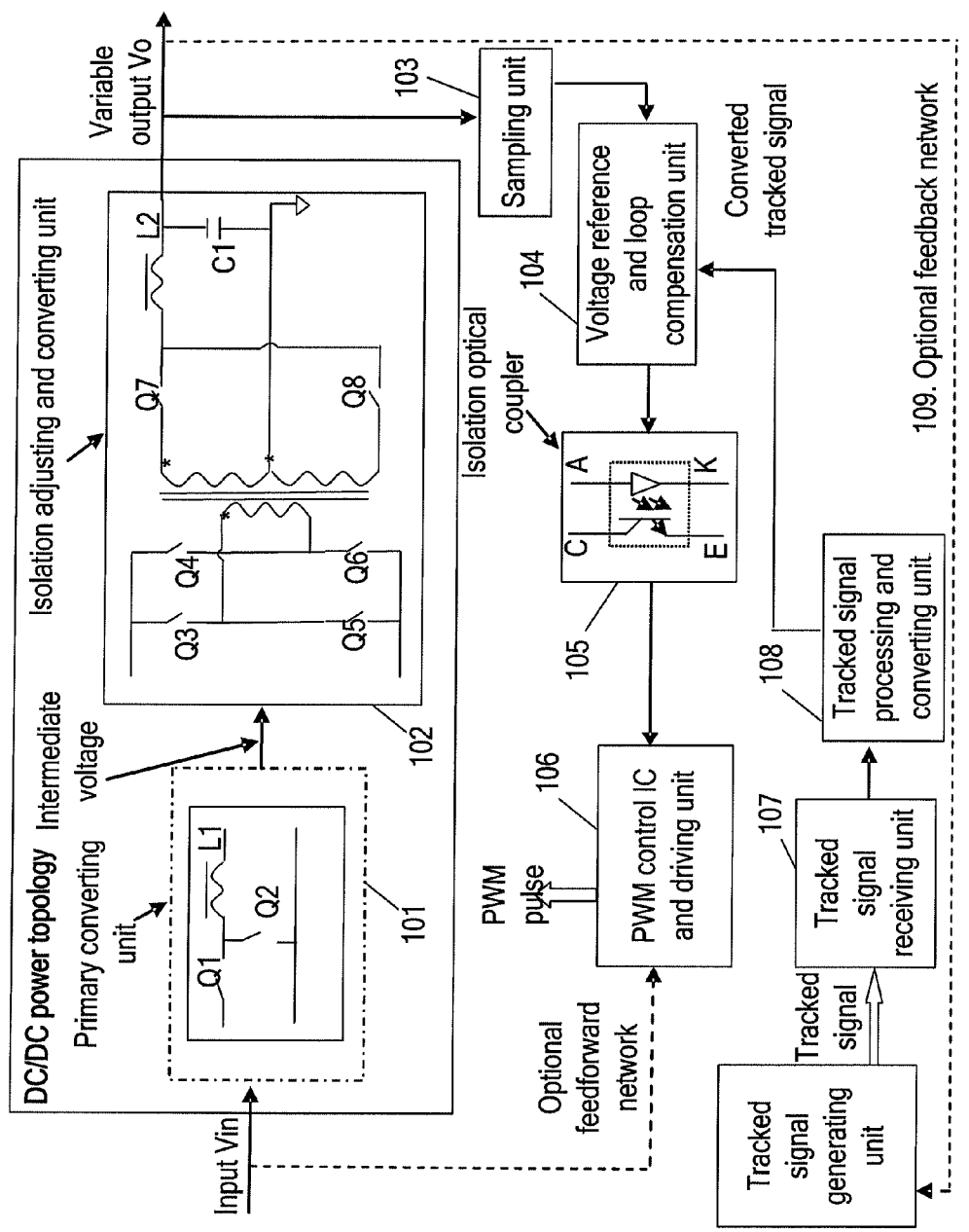
FIG. 1 is a schematic diagram showing the structure of a power supply adjusting apparatus in the prior art.

According to an embodiment of the present disclosure, a power supply adjusting apparatus that provides variable voltages includes a primary isolation converting unit, a voltage adjustment controlling unit and a secondary non-isolation adjusting and converting unit. The primary isolation converting unit is connected to the input power supply to import the input power supply signal; the input of the secondary non-isolation adjusting and converting unit is connected to the primary converting unit and the output of the secondary non-isolation adjusting and converting unit is an output of the power supply adjusting apparatus. The voltage adjustment controlling unit determines and outputs an adjustment control signal with respect to the output voltage according to the expected output voltage and a tracked signal provided by the powered apparatus. No isolation is needed in the voltage adjustment controlling unit. The solution provided in the embodiment of the present disclosure overcomes the weaknesses induced by the isolation in the voltage adjusting circuit so that real-time voltage adjustment is realized.

The specific implementation of each unit of the power supply adjusting apparatus provided in the embodiment of the present disclosure will be described in detail.

In the embodiments of the present disclosure, the power supply adjusting apparatus includes a primary isolating converting unit, adapted to convert the voltage or current of an input power supply signal to obtain a power supply signal that has a preset voltage or current intensity (possibly an intermediate voltage or an intermediate current source).

In practice, the primary isolation converting unit may be an isolation converting unit or a cascade isolation converting unit capable of primary adjustment control. The isolation converting unit is adapted to convert the voltage or current of the input power supply signal and may be of a half-bridge isolation conversion structure, a forward isolation conversion structure or a full-bridge isolation conversion structure; the primary adjustment controlling unit is adapted to control the primary isolation converting unit to output a power supply signal that has the preset voltage or current intensity and may adopt feed forward control, feedback control, open-loop control and/or cascade composite control.

In the embodiments of the present disclosure, the voltage adjustment controlling unit may determine and output an adjustment control signal with respect to the output voltage according to the output voltage and the tracked signal provided by the powered apparatus. The voltage adjustment controlling unit includes a sampling unit, a tracked signal sampling unit, a voltage reference and loop compensation unit and a secondary PWM controller IC and driving unit.

The sampling unit is adapted to: monitor and obtain a variation of the output voltage and output the variation to the voltage reference and loop compensation unit.

The tracked signal sampling unit is adapted to: monitor and obtain the tracked signal outputted by the powered apparatus and output the signal to the voltage reference and loop compensation unit; the tracked signal sampling unit further includes a tracked signal generating unit, a tracked signal receiving unit and a tracked signal processing and converting unit. The tracked signal generating unit is adapted to generate the tracked signal according to the service status of the powered apparatus; the tracked signal receiving unit is adapted to receive the tracked signal generated by the tracked signal generating unit and output the signal to the tracked signal processing and converting unit; and the tracked signal processing and converting unit is adapted to convert the tracked signal outputted by the tracked signal receiving unit to obtain the tracked signal and output the signal to the voltage reference and loop compensation unit. The tracked signal obtained by the tracked signal processing and converting unit matches the secondary PWM controller IC and driving unit.

The voltage reference and loop compensation unit is adapted to: determine an adjustment control signal according to the output of the sampling unit and the output of the tracked signal sampling unit and output the signal to the secondary PWM controller IC and driving unit.

The secondary PWM controller IC and driving unit is adapted to output a PWM signal according to the adjustment control signal received from the voltage reference and loop compensation unit, where the PWM signal is used to adjust the output voltage of the secondary non-isolation adjusting and converting unit.

In the embodiments of the present disclosure, the power supply adjusting apparatus includes a secondary non-isolation adjusting and converting unit which is connected to the output of the power supply and adapted to adjust the power supply signal outputted by the primary isolation converting unit according to the adjustment control signal outputted by the voltage adjustment controlling unit to obtain and output the output voltage required by the powered apparatus. The secondary non-isolation adjusting and converting unit may be of a buck non-isolation structure, a boost non-isolation structure, a buck-boost non-isolation structure, a multiphase interleaving buck non-isolation structure or an H-bridge structure, or a multiphase H-bridge structure.

Exemplary embodiments of the present disclosure will be described below.

Embodiment 1

Figure 2:
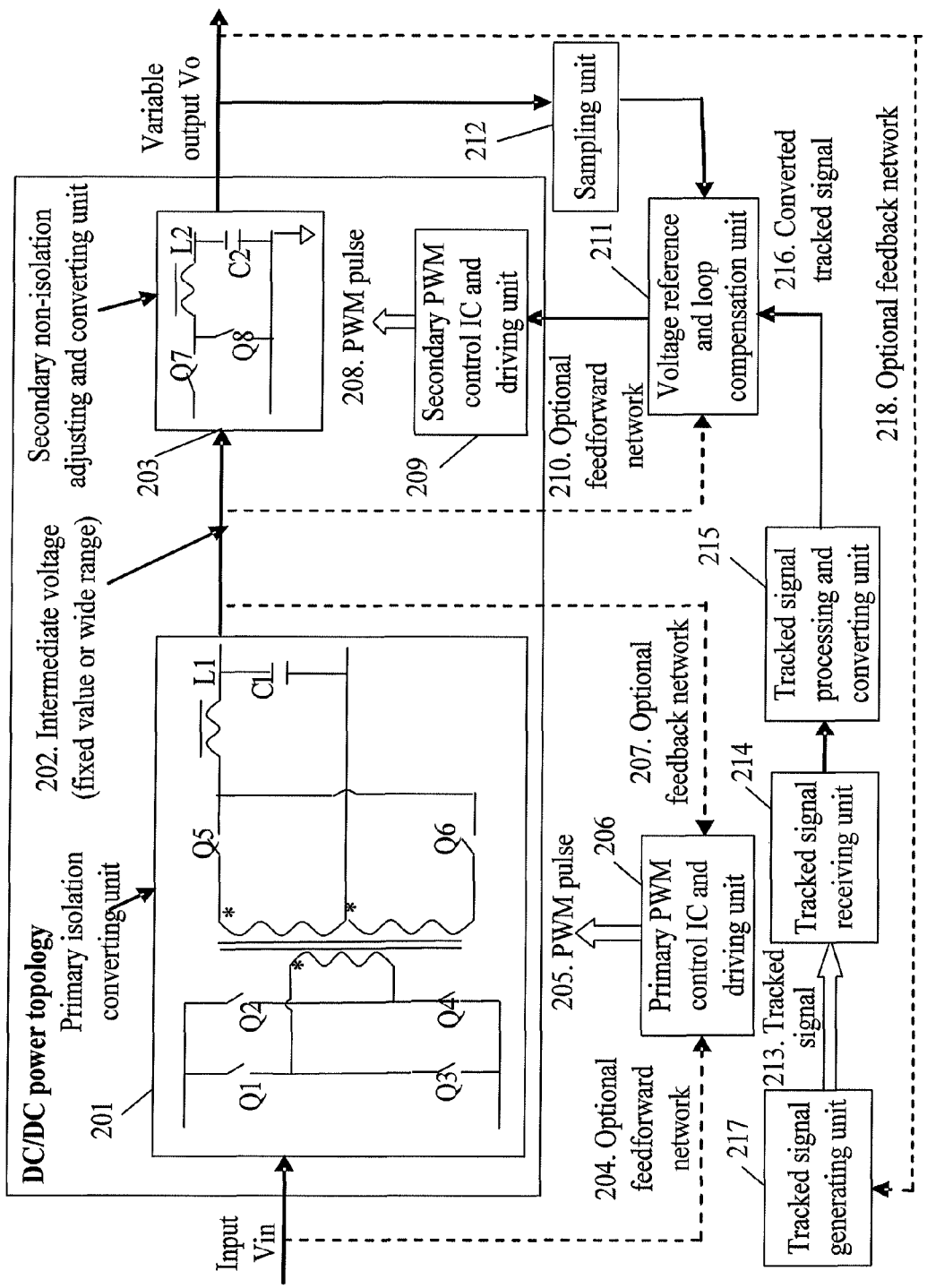
FIG. 2 is a schematic diagram showing the structure of a power supply adjusting apparatus according to a first embodiment of the present disclosure.

FIG. 2 shows a power supply adjusting apparatus, where a primary isolation converting unit 201 adjusts and inverts the input voltage (such as −48V in a communication system) to an intermediate voltage 202 (may be a fixed value or within a certain range), and a secondary non-isolation adjusting and converting unit 203 implements real-time dynamic voltage adjustment. In this way, the power supply adjusting apparatus avoids the weaknesses induced by isolation in the traditional solution so that the application of real-time voltage adjustment is possible. In this embodiment, the primary isolation converting unit 201 is of a bridge isolation conversion structure and the secondary non-isolation adjusting and converting unit 203 may take on a buck non-isolation structure. Both the primary isolation converting unit 201 and the secondary non-isolation adjusting and converting unit 203 may take on other structures mentioned hereinbefore.

As shown in FIG. 2, the working principle of the first embodiment is as follows (taking a communication system as an example and supposing the input voltage range is −36V to −72V): the primary isolation converting unit 201 takes on a structure of full-bridge isolation+full-wave synchronous rectification (the control mode may be feed forward control, feedback control, full open loop control, or cascade composite control); a primary PWM controller IC and driving unit 206 (the primary adjustment controlling unit) generates a preset PWM pulse 205 to control the turn-on and turnoff of switch tubes Q1 to Q6 of the primary isolation converting unit 201 so as to generate an intermediate voltage 202; the intermediate voltage 202 may be determined according to comprehensive consideration of efficiency and bandwidth required by the system; an optional feedback network 207 may be adapted to obtain a stable intermediate voltage (e.g. 48V); optionally, a full open loop control mode may be adapted to output an intermediate voltage within a wide range (for example, +36V to +72V); or, an optional feed forward network 204 is adapted to output an intermediate voltage within a narrow range (for example, +42V to +54V). The purpose of power supply conversion at this stage is to achieve isolation based electrical conversion so as to generate the intermediate voltage 202.

A secondary non-isolation adjusting and converting unit 203 is adapted to receive an external tracked signal 213 and implement real-time adjustment of the output voltage via non-isolation real-time PWM. The secondary non-isolation adjusting and converting unit 203 may take on a buck non-isolation structure, a boost non-isolation structure, a buck-boost non-isolation structure, a multiphase interleaving buck non-isolation structure or an H-bridge structure, or a multiphase H-bridge structure depending on the value of the intermediate voltage 202 and the required secondary output voltage range. According to the required power supply bandwidth and voltage adjustment speed, the secondary non-isolation adjusting and converting unit 203 may adopt policies including but not limited to multiphase parallelism and non-linear control (such as hysteresis loop control) to optimize the dynamic bandwidth of the real-time adjusted power supply.

Herein, the secondary non-isolation adjusting and converting unit 203 adopting buck conversion with real-time PWM and the working principle is taken as an example: a variation of the output voltage Vo is sent by a sampling unit 212 to a voltage reference and loop compensation unit 211 (similar to the voltage reference and loop compensation unit 104 in FIG. 1); the voltage reference and loop compensation unit 211 receives the output voltage signal fed by the sampling unit and meanwhile receives a converted tracked signal 216, which is obtained after a tracked signal 213 generated by a tracked signal generating unit 217 is received by a tracked signal receiving unit 214 and converted by a tracked signal processing and converting unit 215. The error between the two signals is appropriately amplified and filtered by the voltage reference and loop compensation unit 211 to generate an error control signal, which is then sent to a secondary PWM controller IC and driving unit 209; the secondary PWM controller IC and driving unit 209 adjusts an output PWM pulse 208 in real time according to the change in Vcom to control the turn-on and turnoff of the switch tubes and rectifier diodes Q7 and Q8 in the power structure so that the output voltage is adjusted in real time to an expected target value.

Embodiment 2

Figure 3:
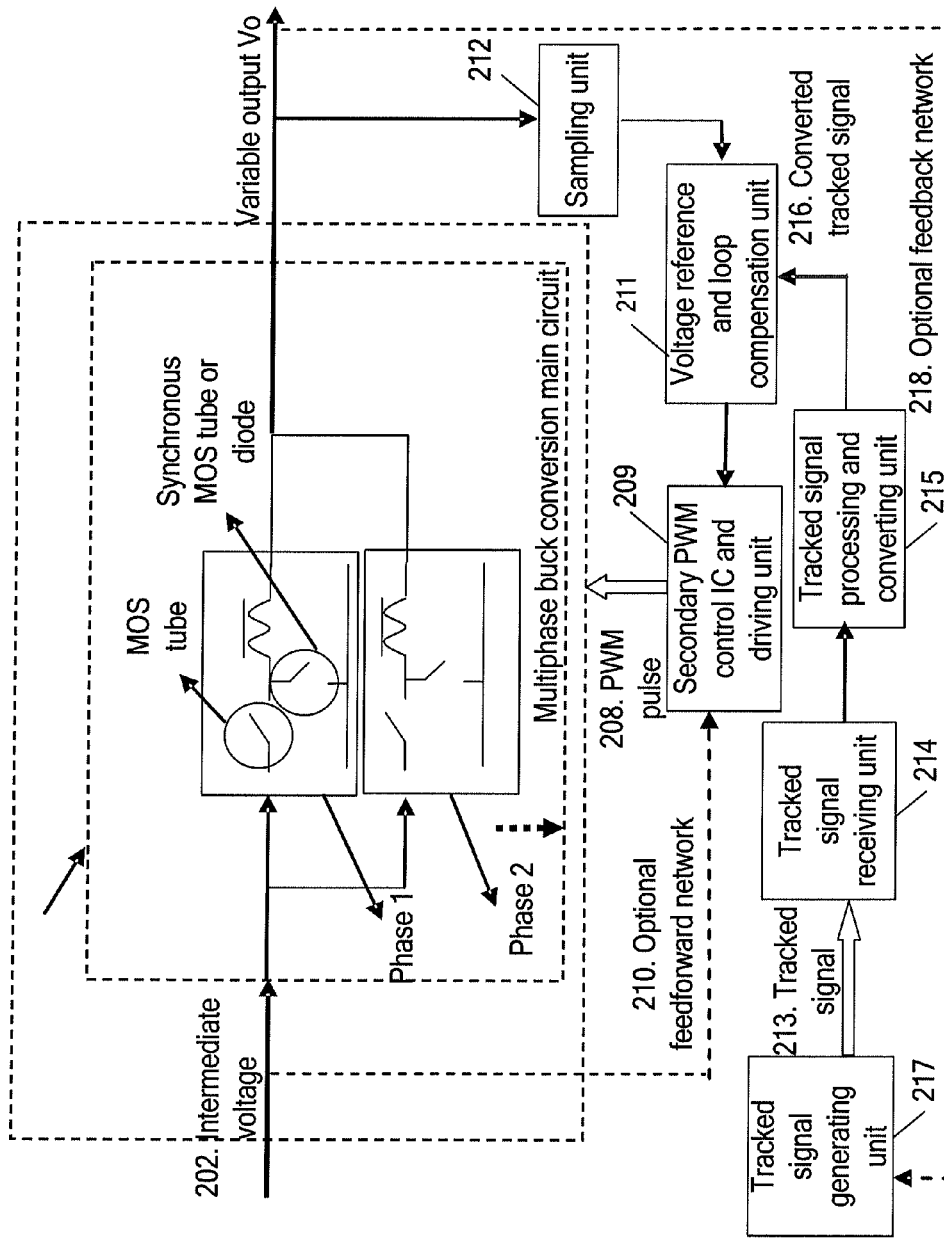
FIG. 3 is a schematic diagram showing the structure of a power supply adjusting apparatus according to a second embodiment of the present disclosure.

The power supply adjusting apparatus shown in FIG. 3 is different from the apparatus in the first embodiment only in that the secondary non-isolation adjusting and converting unit 203 takes on a multiphase interleaving buck non-isolation structure. With the bandwidth expansion capability of the multiphase technology, the power supply adjusting apparatus may obtain an output ripple frequency equivalent to $n*f_s$ on the basis of a same switching frequency $f_s$. Therefore, under the same ripple requirement, lower output L and C values can be chosen so that the working bandwidth of the secondary non-isolation adjusted power supply and the efficiency and comprehensive bandwidth performance of the entire real-time adjustment converter may be better.

In practicing the first and the second embodiments, the secondary PWM controller IC in FIG. 2 may be a digital controller such as a Digital Signal Processor (DSP), a Micro Controller Unit (MCU), and an Application Specific Integrated Circuit (ASIC). The secondary non-isolation adjusting and converting unit 203 may use some optimized loop digital control policies (such as adaptive Proportional-Integral-Derivative (PID) control and one-cycle control) to further improve the efficiency and the comprehensive bandwidth performance of the adjustable power supply. When this solution is applied to a system, to avoid the delay induced by transfer of the tracked signal 213 from the tracked signal generating unit 217 to the voltage reference and loop compensation unit 211, the above solutions may be implemented directly on a core signal processor (such as a DSP and a Field Programmable Gate Array, FPGA) already existing in the system so that service processing and power supply detection and control are integrated into one high-speed processor and a higher bandwidth response capability can therefore be obtained. The efficiency of the entire system will be further improved.

The power supply adjusting apparatus with the above improved structure is applicable to the dynamic voltage adjustment for a powered radio apparatus in the communication field. Isolation conversion and real-time tracking and adjustment are separately implemented via a two-stage structure of the power supply so that power supply is easier to implement and that real-time dynamic voltage adjustment can be realized more quickly.

Embodiment 3

Figure 4:
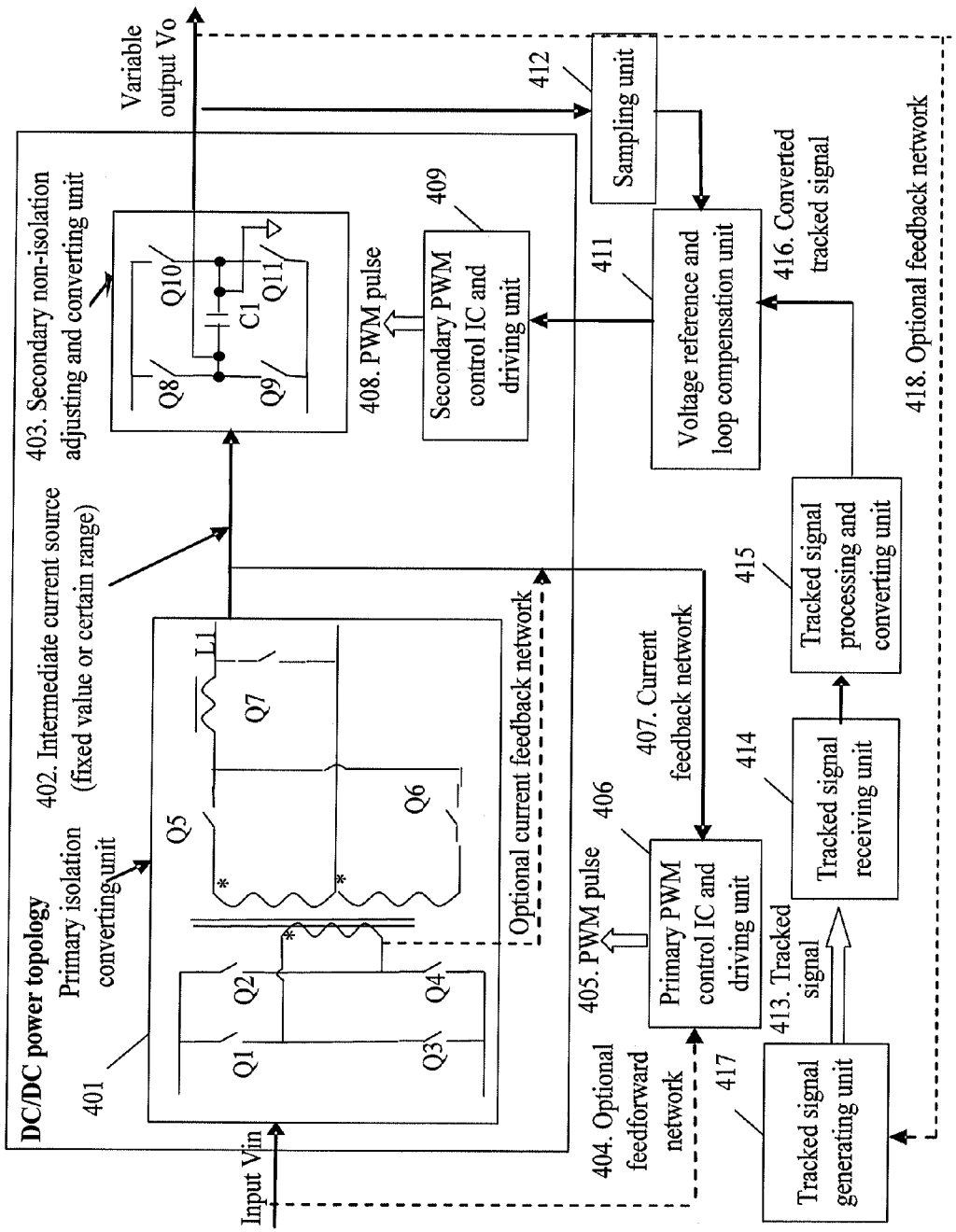
FIG. 4 is a schematic diagram showing the structure of a power supply adjusting apparatus according to a third embodiment of the present disclosure.

The power supply adjusting apparatus shown in FIG. 4 includes a primary isolation converting unit 401 which converts the input voltage (for example, −48V in a communication system) into an intermediate current source 402 (a fixed current source or a current source within a certain range) and a secondary non-isolation adjusting and converting unit 403 which implements real-time dynamic voltage adjustment.

As shown in FIG. 4, the working principle of the third embodiment is as follows (taking a communication system as an example and supposing the input voltage range is −36V to −72V): the primary isolation converting unit 401 takes on a structure similar to full-bridge isolation+full-wave synchronous rectification (optionally, the full-wave synchronous rectification structure may be any other conversion structure, such as the commonly seen full-bridge rectification and double current rectification; the topological structure may be half-bridge, forward, or cascade composite; the control mode may be feed forward control, feedback control, full open loop control or cascade composite control); a primary PWM controller IC and driving unit 406 generates a PWM pulse 405 that meets a certain requirement to control the turn-on and turnoff of Q1 to Q7 in the primary isolation converting unit 401 so as to generate an intermediate current source 402; the intermediate current source 402 may enable a constant current source output or a current source output within a certain range according to different sampling points of current feedback control. The Q5 and Q6 in FIG. 4 may be replaced by diodes as required, and Q7 is a controllable switch adapted to create an internal current loop required by normal work when there is no output load. The main purpose of power supply conversion at this stage is to implement isolation based electrical conversion and generate the required intermediate current source 402, which may be implemented by any current source generating structure or an implementation structure of certain current feeds.

A secondary non-isolation adjusting and converting unit 403 receives an external tracked signal 413 and implements real-time dynamic adjustment of the output voltage Vo by charge and discharge control of the output capacitor C1 via an H-bridge network made up of Q8 to Q11. The secondary non-isolation adjusting and converting unit 403 may take on a buck non-isolation structure, a boost non-isolation structure, a buck-boost non-isolation structure, a multiphase interleaving buck non-isolation structure or an H-bridge structure, or a multiphase H-bridge structure, or any other similar non-isolation structure, depending on the value of the intermediate current source 402 and the required secondary output voltage range. According to the required power supply bandwidth and voltage adjustment speed, the secondary non-isolation adjusting and converting unit 403 may adopt policies including but not limited to multiple current source parallelism with separate phase supply and nonlinear control (such as hysteresis loop control) to optimize the dynamic bandwidth of the real-time adjusted power supply.

Herein, the secondary non-isolation adjusting and converting unit 403 adopts H-bridge conversion with real-time PWM and the working principle is like this: a variation of the output voltage Vo is sent by a sampling unit 412 to a voltage reference and loop compensation unit 411 (similar to the voltage reference and loop compensation unit 104 in FIG. 1); the voltage reference and loop compensation unit 411 receives the output voltage signal fed by the sampling unit and meanwhile receives a converted tracked signal 416, which is obtained after a tracked signal 413 generated by a tracked signal generating unit 416 is received by a tracked signal receiving unit 414 and converted by a tracked signal processing and converting unit 417. The error between the two signals is appropriately amplified and filtered by the voltage reference and loop compensation unit to generate an error control signal Vcom, which is then sent to a secondary PWM controller IC and driving unit 409; the secondary PWM controller IC and driving unit 409 adjusts an output PWM pulse 408 in real time according to the change in Vcom to control the turn-on and turnoff of the switch tubes Q8 to Q11 in the power structure. When the output voltage needs to be boosted, Q8 and Q11 are turned on to charge C1 and boost the voltage; when the output voltage needs to be bucked, Q9 and Q10 are turned on to charge C1 inversely to the effect of discharging C1 and bucking the voltage. Thereby, the output voltage is adjusted in real time to an expected target value.

In this embodiment, the secondary PWM controller IC may be a digital controller such as a DSP, an MCU, and an ASIC. The secondary non-isolation adjusting and converting unit 403 may use some optimized loop digital control policies (such as adaptive PID control and one-cycle control) to further improve the efficiency and the comprehensive bandwidth performance of the adjustable power supply.

In this embodiment, the structure improved power supply system is applicable to the dynamic voltage adjustment for a powered radio apparatus in the communication field. An isolation converted current source is generated separately to control the charge and discharge of the output capacitor in real time so as to implement real-time tracking and adjustment and further implement fast real-time dynamic voltage adjustment.

Embodiment 4

Figure 5:
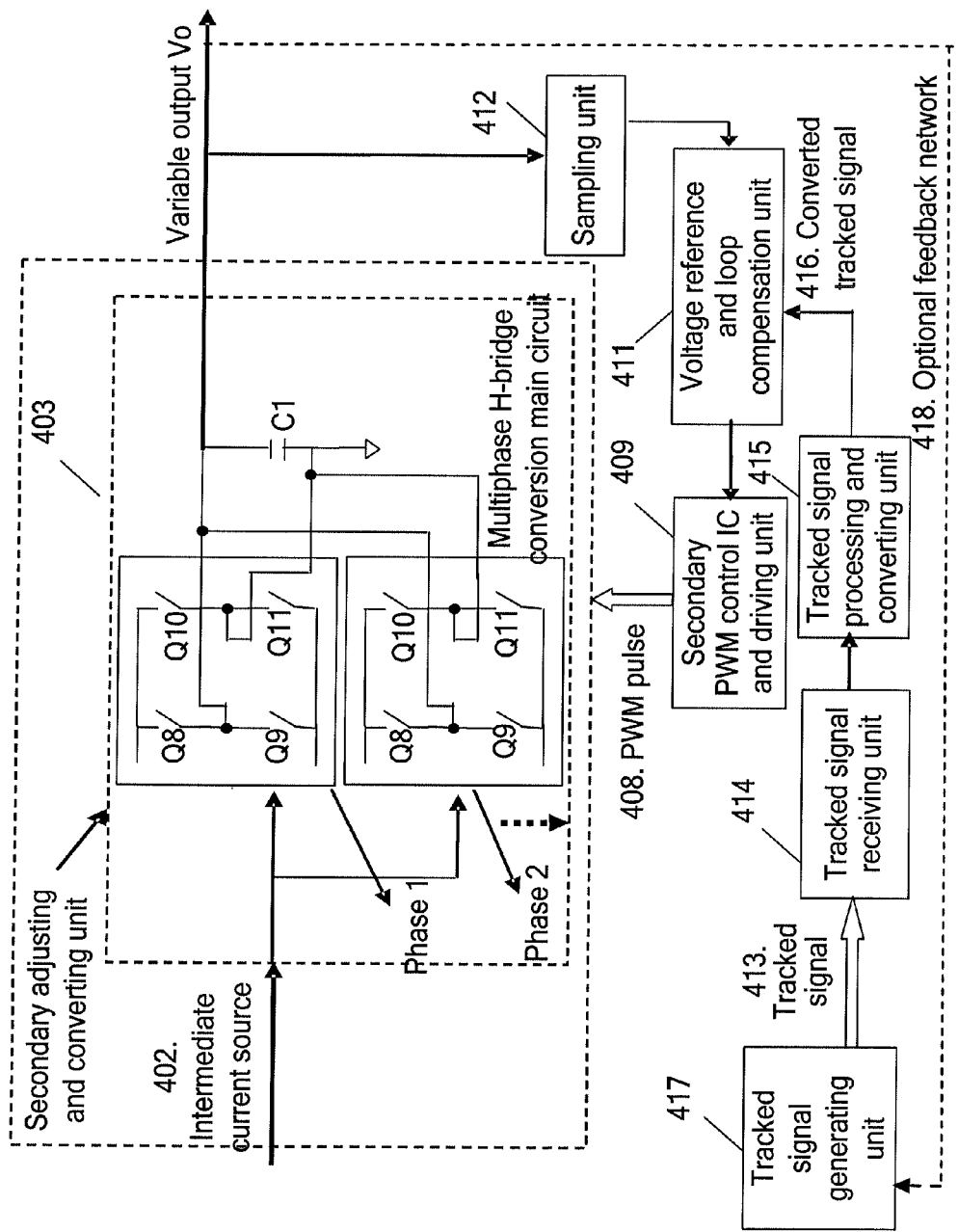
FIG. 5 is a schematic diagram showing the structure of a power supply adjusting apparatus according to a fourth embodiment of the present disclosure.

The power supply adjusting apparatus shown in FIG. 5 is different from the apparatus in the third embodiment only in that the secondary non-isolation adjusting and converting unit 403 takes on a multiphase interleaving H-bridge non-isolation structure. With the bandwidth expansion capability of the multiphase technology, the power supply adjusting apparatus can obtain an output ripple frequency equivalent to $n*f_s$ on the basis of a same switching frequency $f_s$. Therefore, under the same ripple requirement, a lower output C value can be chosen so as to obtain better precision of voltage stabilization. The working bandwidth of the secondary non-isolation adjusted power supply is therefore improved and the efficiency and the comprehensive bandwidth performance of the entire real-time adjustment converter can be better.

The solution in the foregoing embodiments can be applied, without limitation, to fast voltage adjustment scenarios, such as TT or slow ET power amplification scenarios. For faster voltage adjustment scenarios, such as a scenario with faster ET or EER power amplification, the apparatus further includes a tracked signal frequency division processing unit and a precise tracked voltage correcting unit.

The tracked signal frequency division processing unit is adapted to divide the received tracked signal into a high frequency signal and a low frequency signal according to a preset policy, where the low frequency signal is sent to the voltage adjustment controlling unit.

The precise tracked voltage correcting unit is adapted to: adjust the voltage outputted by the voltage adjustment controlling unit according to the high frequency signal outputted by the tracked signal frequency division processing unit and output the adjusted voltage.

The solutions of the present disclosure are further explained with reference to exemplary embodiments.

Embodiment 5

Figure 6:
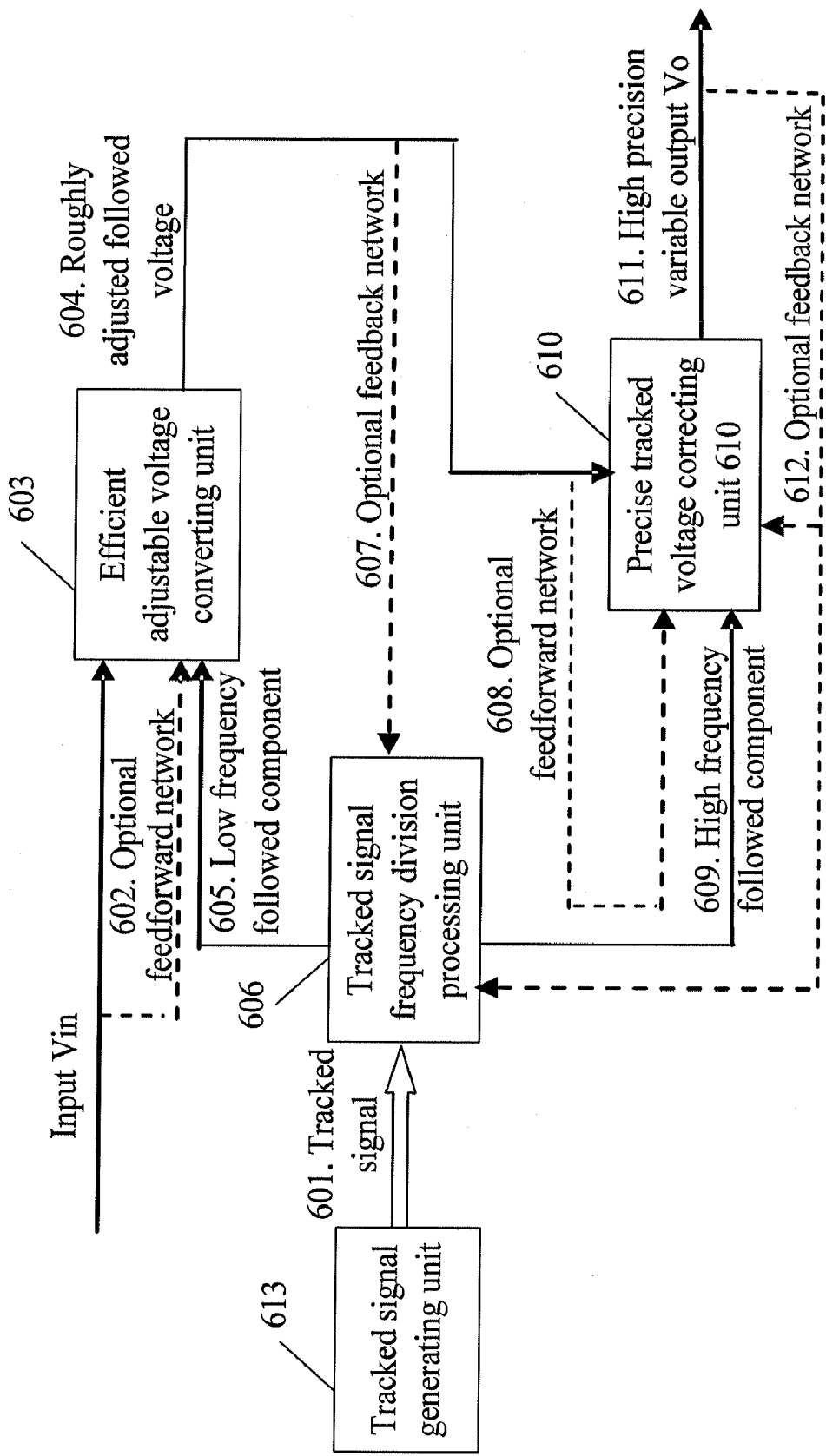
FIG. 6 is a schematic diagram showing the structure of a power supply adjusting apparatus according to a fifth embodiment of the present disclosure.

As shown in FIG. 6, a cascade mode combining a high bandwidth adjustable power supply and secondary precise correction is adopted in this embodiment of the present disclosure to obtain higher dynamic voltage adjustment performance. A tracked signal frequency division processing unit 606 divides a received tracked signal according to a preset policy into a high frequency tracked component 609 (a high frequency followed component, or a high frequency signal) and a low frequency tracked component 605 (a low frequency followed component, or a low frequency signal). A primary efficient adjustable voltage converting unit 603 tracks the low frequency tracked component 605 (a low frequency signal, such as a tracked signal component below 10 kHz) in the tracked signal 601 and generates a roughly adjusted tracked voltage 604 which has a frequency slightly higher than the target tracked signal; then a secondary precise tracked voltage correcting unit 610 corrects the roughly adjusted voltage 604 generated at the primary stage according to the high frequency tracked component 609 (a high frequency signal) in the tracked signal 601 so as to obtain a target high precision variable output voltage 611.

The efficient adjustable voltage converting unit 603 in FIG. 6 may take on a structure proposed in the solutions shown in FIG. 2 and FIG. 4 or its derivative structure, or any adjustable power supply generating apparatus that meets the condition. Any solution that implements a variable tracked voltage, a traditional switch power supply or a multi-output power supply, is covered by the embodiments of the present disclosure. To assure the precision of the rough intermediate voltage, an optional feed forward network 602 or an optional feedback network 607 may be adapted to further correct the roughly adjusted tracked voltage 604 so that the roughly adjusted tracked voltage 604 reaches the required precision.

In FIG. 6, the precise tracked voltage correcting unit 610 cascaded at the secondary stage is adapted to precisely correct the rough intermediate voltage generated at the primary stage so as to generate a high frequency component expected to follow via a higher bandwidth converting unit. To maximize the work efficiency of the correcting unit, the primary efficient adjustable voltage converting unit 603 must be designed to guarantee a low value of a correction part 614 (referring to FIG. 7) at the stage. This correction part may be any linear correcting circuit of a low voltage difference and high bandwidth, including but not limited to any optional high-speed linear adjuster unit. Herein, the cascade linear correction mode for compensation is stressed. In practice, for the purpose of precise correction of the roughly adjusted tracked voltage 604 so as to output the target high precision variable output voltage 611, the precise tracked voltage correcting unit 610 may further correct the high precision variable output voltage 611 via an optional feed forward network 608 or an optional feedback network 612.

Figure 7:
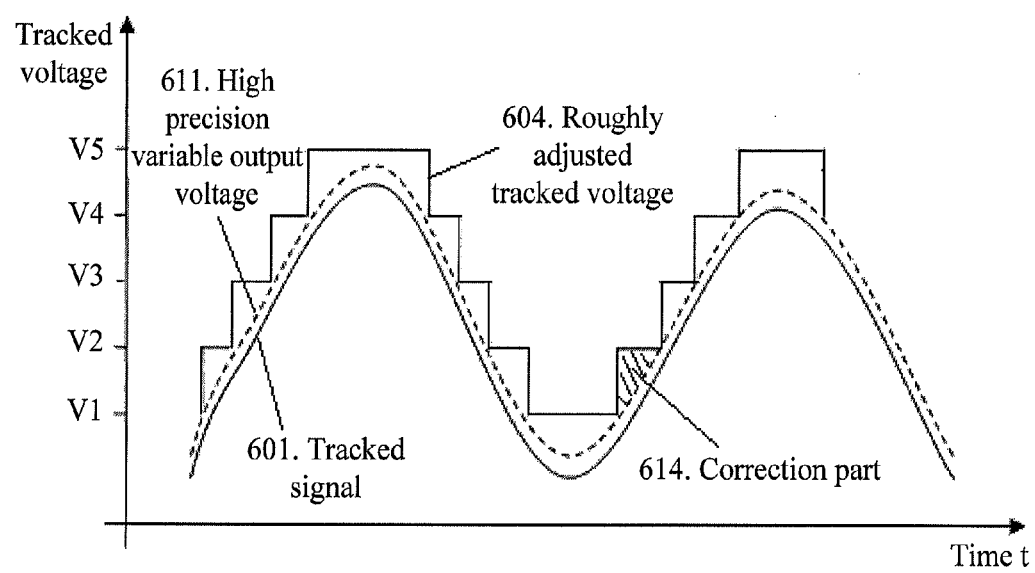
FIG. 7 is a schematic diagram showing the precise correction of the power supply adjusting apparatus according to the fifth embodiment of the present disclosure.

The correcting method is shown in FIG. 7, where the tracked signal 601 represents an expected reference tracked voltage curve and the high precision variable output voltage 611 represents the ultimate high precision variable output curve. By means of the high-speed tracked voltage adjustment solution shown in FIG. 6, the input voltage Vin is processed by the efficient adjustable voltage converting unit 603 to generate the roughly adjusted tracked voltage 604, whose value should be controlled to be a little higher than the high precision variable output voltage 611. The precise tracked voltage correcting unit 610 compensates the difference between the roughly adjusted tracked voltage 604 and the target high precision variable output voltage 611, the shadowed correction part 614 in FIG. 7, so as to obtain the final target high precision variable output voltage 611.

It should be understood that the target high precision variable output curve 611 does not need to be exactly the same as the input reference tracked voltage curve 601. There is probably a deviation between them. Therefore, the target high precision variable output curve 611 may probably be based on or derived from the input reference tracked voltage curve 601 (which is exemplary only; the curve is not limited to this voltage curve), and FIG. 7 only shows a certain scenario. In FIG. 7, the roughly adjusted tracked voltage 604 is represented by a curve consisting of 5 separate voltage values. Each voltage of V1 to V5 represents a particular roughly adjusted tracked voltage 604 generated by the primary efficient adjustable voltage converting unit 603. The choice of V1 to V5 depends on the input reference tracked voltage 601. The design principle is to generate a voltage which is slightly higher than the target high precision variable output voltage 611. The shadowed correction part 614 is a compensation value of the precise tracked voltage correcting unit 610 cascaded at the secondary stage. The compensation is completed by a secondary linear correcting circuit that has a higher bandwidth and a lower voltage difference. A high precision tracked voltage close to the system requirement is generated by means of the higher bandwidth cascade power supply conversion, which reduces excessive energy loss and maximizes the average system efficiency. This solution is applicable, without limitation, to scenarios with ET or EER power amplification.

The five rough voltages V1 to V5 in FIG. 7 are exemplary only. In practice, the roughly adjusted tracked voltage 604 may have more value choices or be chosen from the infinite number of voltage values generated by the primary higher bandwidth efficient adjustable voltage converting unit 603. All of these are within the coverage of the embodiments of the present disclosure.

In practice, the tracked signal frequency band required by the primary and secondary circuits should be allocated according to specific requirements and allow for comprehensive optimal performance of high-efficiency and high-precision fast tracking.

In this embodiment, the voltage adjustment controlling unit is placed in a powered apparatus and implemented by a core processing unit of the powered apparatus, which outputs a voltage to the primary isolation converting unit and/or secondary non-isolation adjusting and converting unit. The powered apparatus also includes an adjustment requesting unit, adapted to receive an output power supply voltage signal and output an expected voltage adjustment parameter to the core processing unit.

The specific implementation is as follows.

Embodiment 6

Figure 8:
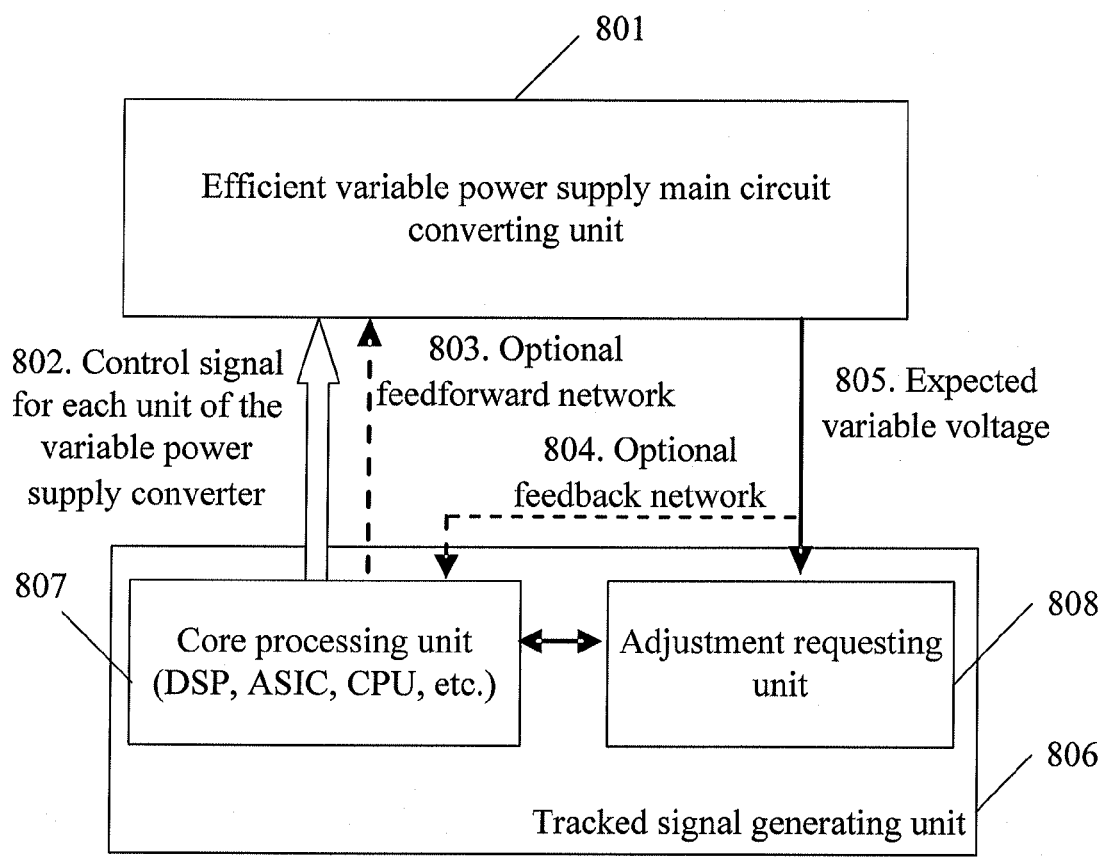
FIG. 8 is a schematic diagram showing the structure of a power supply adjusting apparatus according to a sixth embodiment of the present disclosure.

FIG. 8 shows a further system structure of the power supply adjusting apparatus provided in the embodiments of the present disclosure. When the application system includes core digital controllers like the DSP, ASIC and CPU, to avoid the delay induced by transfer of the tracked signal from a tracked signal generating unit 806 and a variable power supply converter, namely, an efficient variable power supply main circuit converting unit 801 (which may be any power supply adjusting apparatus in the first to fifth embodiments and include a primary converting unit and a secondary non-isolation adjusting and converting unit) and remove the impact of the delay on the speed of dynamic adjustment response of the system, existing feasible power supply control loop algorithms are transplanted directly to an existing core processing unit of the tracked signal generating unit 806, where the core processing unit includes but is not limited to the DSP, ASIC, and CPU. In this way, the main circuit of the variable power supply is separated and directly receives the control signal generated by the core processing unit 807 of the tracked signal generating unit 806 so that the supply voltage of an adjustment requesting unit 808 (for example, the bias voltage of a PA) is adjusted in real time. Thus, a more efficient and higher bandwidth system solution is realized. Besides, the adjustment requesting unit 808 receives an output power supply voltage signal (may be an expected variable voltage 805) and outputs an expected voltage adjustment parameter to the core processing unit.

Herein, a feed forward network 803 provides feed forward control, which simply means adjusting the duty ratio of a PWM pulse outputted by the controller IC by detecting changes in the input power supply of the power supply converter, so as to adjust the output voltage. This is a rough adjustment and the precision of the output voltage is hard to control.

A feedback network 804 provides feedback control and is often applied to scenarios requiring stable output voltages. When voltage adjustment is implemented, the voltage reference of its comparer may be changed so that the duty ratio of the PWM pulse outputted by the controller IC is adjusted after error amplification and compensation and thus the output voltage is adjusted. Optionally, the output voltage may be fed back to the tracked signal generating unit to create a closed loop so as to achieve more precise control of the output voltage.

Figure 9:
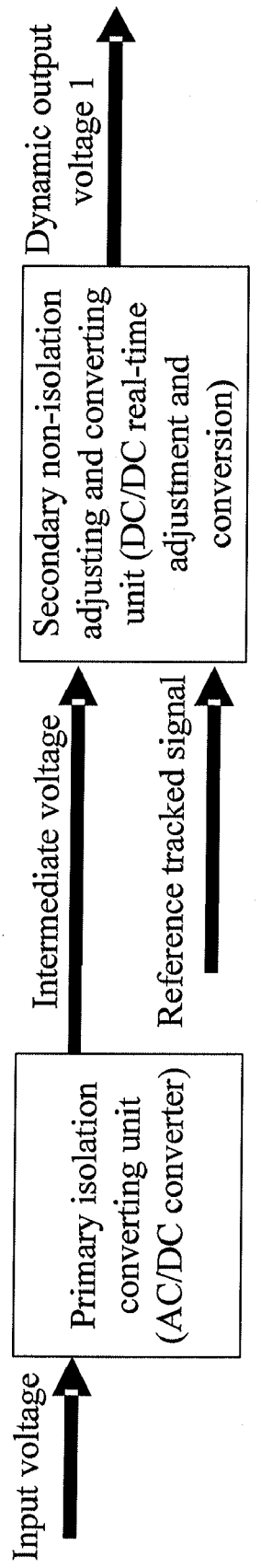
FIG. 9 is a schematic diagram showing a first implementation structure of the apparatus according to an embodiment of the present disclosure.

In addition, in the solutions provided by the first to sixth embodiments of the present disclosure, the primary isolation converting unit may be an independent power supply converting unit, or the intermediate voltage or intermediate current source may be obtained directly from the primary AC/DC conversion of the system and then an independent secondary non-isolation adjusting and converting unit implements fast voltage adjustment. The specific embodiments are as follows:

1. FIG. 9 shows a solution with one primary isolation converting unit and one secondary non-isolation adjusting and converting unit based on the first embodiment, where the two units are independent and the primary isolation converting unit outputs an intermediate voltage.

Figure 10:
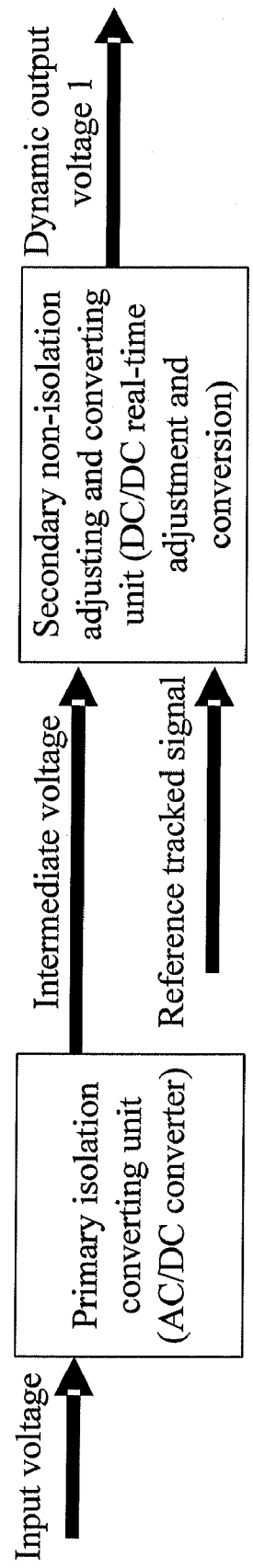
FIG. 10 is a schematic diagram showing a second implementation structure of the apparatus according to an embodiment of the present disclosure.

2. FIG. 10 shows a solution with one primary isolation converting unit and one secondary non-isolation adjusting and converting unit based on the fifth embodiment, where the two units are independent and the primary isolation converting unit outputs an intermediate voltage.

3. FIG. 11 shows a solution with one primary isolation converting unit and one secondary non-isolation adjusting and converting unit based on the third embodiment, where the two units are independent and the primary isolation converting unit outputs an intermediate current source.

4. FIG. 12 shows a solution with one primary isolation converting unit and one secondary non-isolation adjusting and converting unit based on the fifth embodiment, where the two units are independent and the primary isolation converting unit outputs an intermediate current source.

Figure 13:
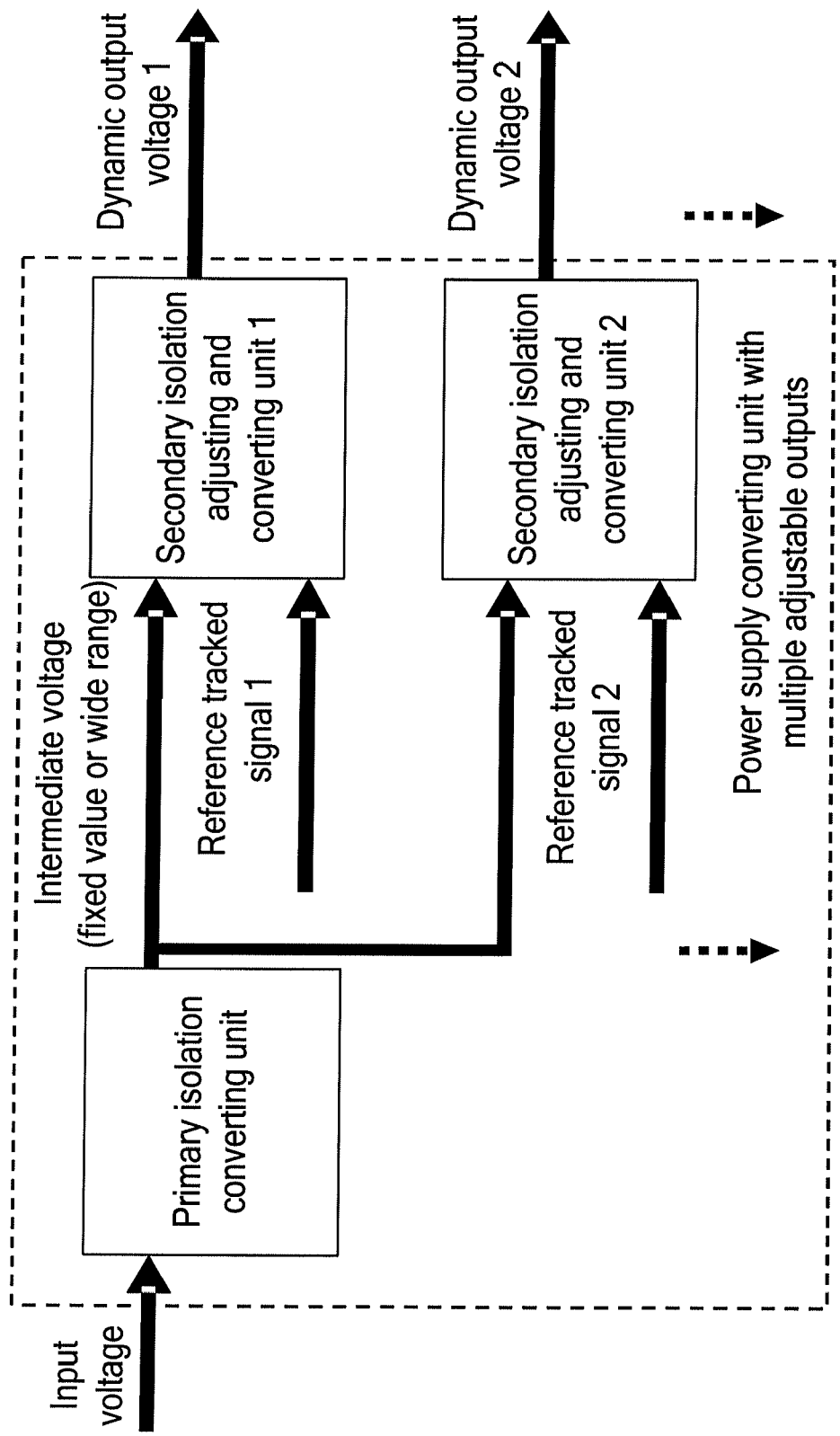
FIG. 13 is a schematic diagram showing a fifth implementation structure of the apparatus according to an embodiment of the present disclosure.

When the system needs multiple real-time dynamic adjusted power supplies and it is necessary to use different reference tracked signals for different adjustment requesting units, the secondary non-isolation adjusting and converting unit (may be a secondary DC/DC real-time adjusting and converting unit) must be split into multiple such units to serve the respective adjustment requesting units, while the primary isolation converting unit is still one. Solutions for a derivative power supply converting unit with multiple adjustable outputs are as follows:

5. In the solution shown in FIG. 13, the primary isolation converting unit outputs an intermediate voltage. As mentioned above, the intermediate voltage may be fixed or within a wide range, depending on the specific structure and the optimal requirement.

Figure 14:
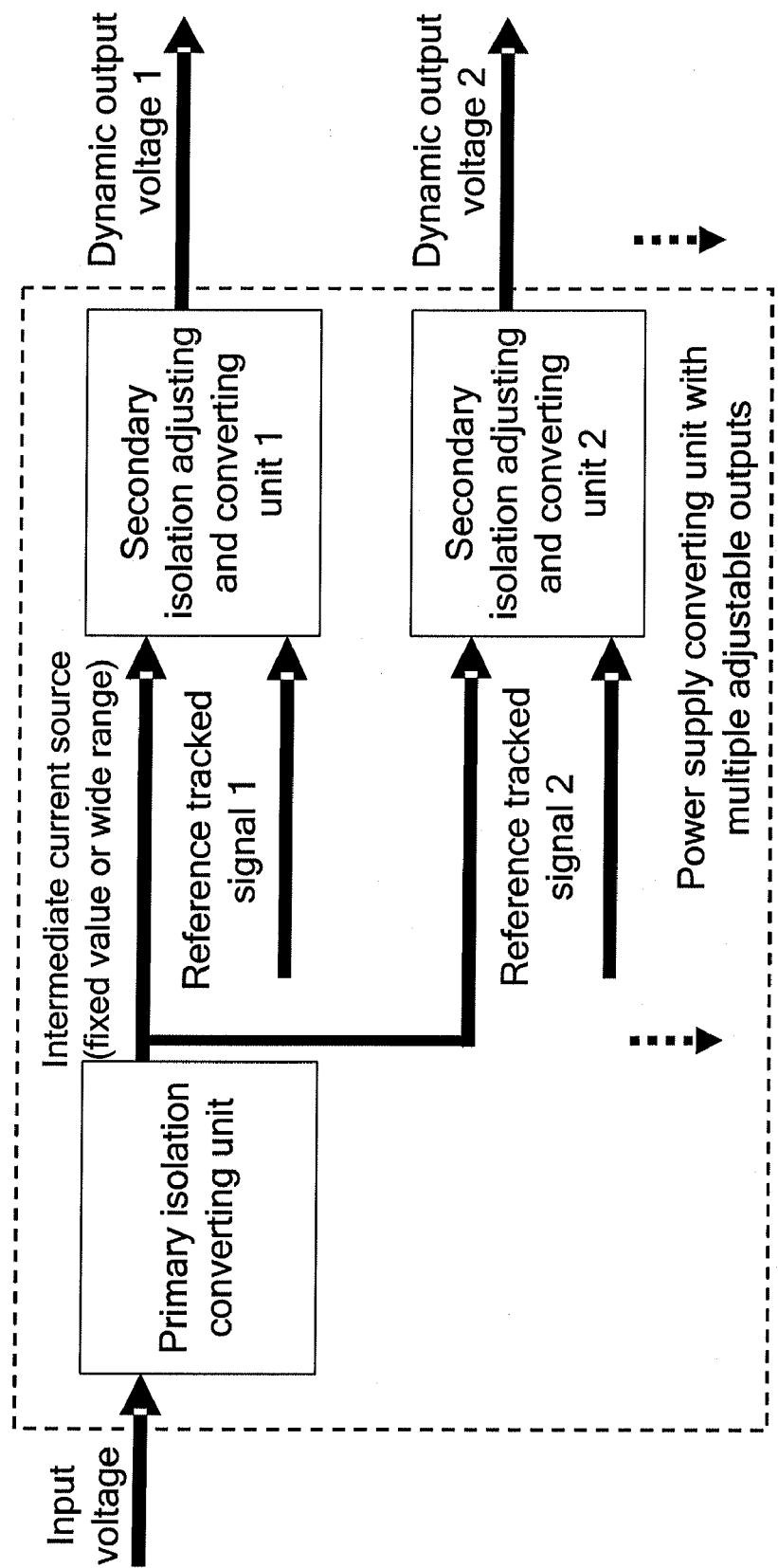
FIG. 14 is a schematic diagram showing a sixth implementation structure of the apparatus according to an embodiment of the present disclosure.

6. In the solution shown in FIG. 14, the primary isolation converting unit outputs an intermediate current source. As mentioned above, the intermediate current source may be fixed or within a wide range, depending on the specific structure and the optimal requirement.

Figure 15:
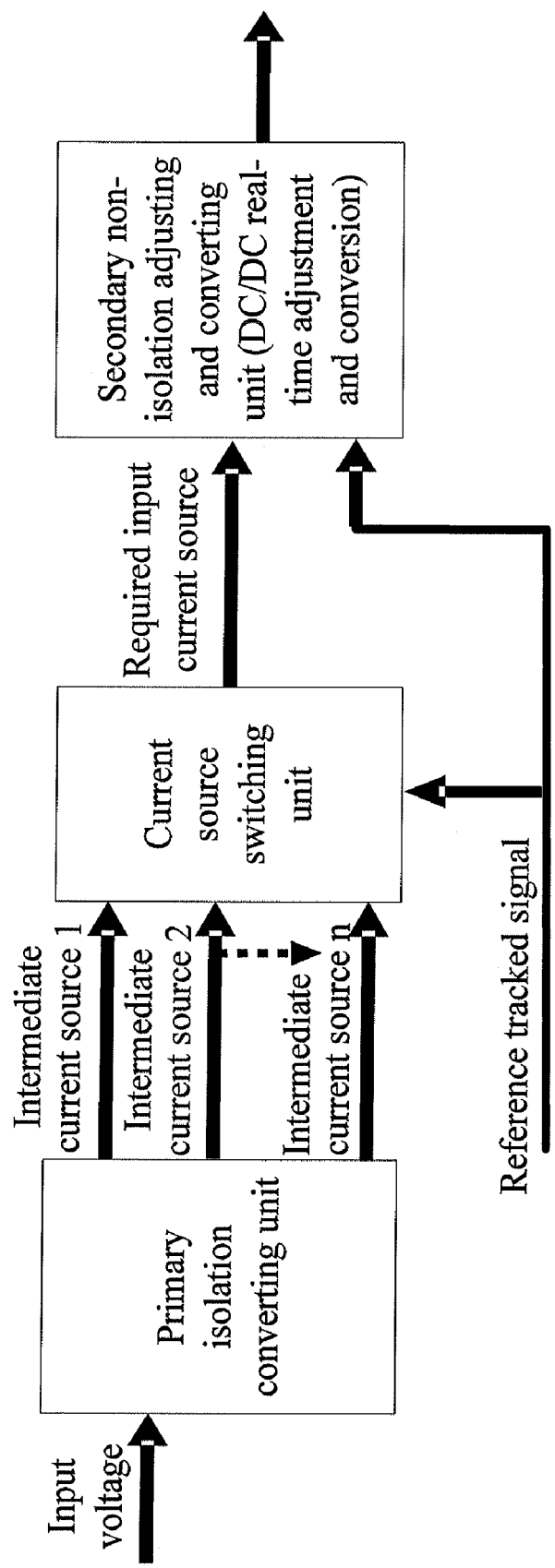
FIG. 15 is a schematic diagram showing a seventh implementation structure of the apparatus according to an embodiment of the present disclosure.

In an embodiment of the present disclosure, the apparatus further includes a current source switching unit, adapted to: receive multiple current source signals outputted by the primary isolation converting unit and choose one power supply signal according to the tracked signal or the adjustment control signal outputted by the voltage adjustment controlling unit, and output the power supply signal to the secondary non-isolation adjusting and converting unit. For example, when the system requires multiple real-time dynamically adjusted power supplies, the primary isolation converting unit (for example, an isolation DC/DC current source converter) may be multiple output current sources, as shown in FIG. 15. The currents outputted by the multiple current sources are of different intensities and, according to the bandwidth status of the tracked dynamic signal and the required adjustment precision, the system switches among the multiple output current sources. If the tracked signal has a small bandwidth, a current source of a small intensity is chosen as the input source for secondary non-isolation adjustment and conversion so as to improve the output precision; if the tracked signal has a high bandwidth, a current source of a large intensity is chosen as the input source for secondary non-isolation adjustment and conversion so as to adapt to the rapid change of dynamic adjustment.

An embodiment of the present disclosure provides a power supply isolating apparatus, including a primary isolation converting unit and a power supply signal outputting unit.

The primary isolation converting unit is adapted to: convert the voltage or current intensity of an input power supply signal and output a power supply signal that meets the expected voltage or current requirement; the primary isolation converting unit may take on a half-bridge isolation conversion structure, a forward isolation conversion structure or a full-bridge isolation conversion structure.

The power supply signal outputting unit is adapted to send the power supply signal obtained by the primary isolation converting unit to a non-isolation adjusting and converting apparatus.

The power supply isolating apparatus may connect a primary adjustment controlling unit to create a cascade composite structure. The primary adjustment controlling unit may adopt feed forward control, feedback control, full open loop control or cascade composite control and be adapted to control the primary isolation converting unit to output a power supply signal that meets the expected voltage or current requirement.

An embodiment of the present disclosure provides a non-isolation adjusting and converting apparatus, including a power supply signal receiving unit and a secondary non-isolation adjusting and converting unit.

The power supply signal receiving unit is adapted to receive the power supply signal outputted by the power supply isolating apparatus.

The secondary non-isolation adjusting and converting unit is adapted to: adjust and convert the power supply signal received by the power supply signal receiving unit from the power supply isolating apparatus to obtain and output a processed power supply voltage; depending on the received voltage or current signal, the secondary non-isolation adjusting and converting unit may take on different structures including but not limited to: buck non-isolation structure, boost non-isolation structure, buck-boost non-isolation structure, multiphase interleaving buck non-isolation structure or H-bridge structure, and multiphase H-bridge structure.

To sum up, the embodiments of the present disclosure introduce a primary current source voltage adjustment or cascade linear correction structure to achieve a higher bandwidth voltage adjusted power supply. The solution offers the following benefits:

1. The solution overcomes the power supply bandwidth limitation of an existing PA. With non-isolation conversion to fulfill real-time adjustment, the solution implements efficient high bandwidth TT and slow ET PA power supply without the participation of the optical coupler and the isolation transformer.

2. The primary voltage-based isolation converting unit may be changed into a current source structure and the secondary non-isolation part may include voltage feedback control to directly control the primary current source in real time so as to realize the eventual real-time voltage adjustment and implement efficient high bandwidth TT and slow ET PA power supply.

3. The solution combines high bandwidth PWM switch adjustment and linear correction. The high bandwidth PWM switch adjusted power supply generates a rough intermediate voltage that is slightly higher than the target tracked voltage and then the cascade linear correction generates a precise tracked voltage so as to implement more efficient high bandwidth TT/ET PA power supply.

4. To avoid impacts of the delay in transferring the adjustment signal between the PA unit and the power supply unit, a power supply control algorithm is embedded in the PA system for direct adjustment control of the power supply so that power supply voltage adjustment is faster and more efficient.

Although the disclosure has been described through several exemplary embodiments, the disclosure is not limited to such embodiments. It is apparent that those skilled in the art can make various modifications and variations to the disclosure without departing from the spirit and scope of the present disclosure. The disclosure is intended to cover the modifications and variations provided that they fall in the scope of protection defined by the following claims or their equivalents.

What is claimed is:

1. A power supply adjusting apparatus, comprising:
a primary isolation converting unit, connected to an input of a power supply and adapted to: convert voltage or current of an input power supply signal from the input of the power supply, and output a power supply signal that meets an expected voltage or current requirement;
a voltage adjustment controlling unit, adapted to: determine an adjustment control signal with respect to the output voltage according to an expected output voltage and a tracked signal provided by a powered apparatus, and output the adjustment control signal; and
a secondary non-isolation adjusting and converting unit, connected to an output of the power supply and adapted to: adjust the power supply signal outputted by the primary isolation converting unit according to the adjustment control signal outputted by the voltage adjustment controlling unit, and output an adjusted power supply signal;
wherein the voltage adjustment controlling unit is placed in the powered apparatus and implemented by a core processing unit of the powered apparatus and outputs a voltage to the primary isolation converting unit and/or secondary non-isolation adjusting and converting unit, and the powered apparatus further comprises an adjustment requesting unit, adapted to receive an adjusted power supply voltage signal and output an expected voltage adjustment parameter to the core processing unit.

2. The power supply adjusting apparatus of claim 1, wherein the primary isolation converting unit is further connected to a primary adjustment controlling unit, the primary adjustment controlling unit is adapted to control the primary isolation converting unit to output the power supply signal that meets the expected voltage or current requirement, wherein the primary adjustment controlling unit is adapted to control the primary isolation converting unit in a plurality of control modes.

3. The power supply adjusting apparatus of claim 1, wherein the structure of the secondary non-isolation adjusting and converting unit comprises a buck non-isolation structure, a boost non-isolation structure, a buck-boost non-isolation structure, a multiphase interleaving buck non-isolation structure, an H-bridge structure, or a multiphase H-bridge structure.

4. The power supply adjusting apparatus of claim 1, wherein the voltage adjustment controlling unit comprises:
a sampling unit, adapted to: monitor and obtain a variation in an output power supply voltage, and output the variation;

a tracked signal sampling unit, adapted to: monitor and obtain the tracked signal outputted by the powered apparatus, and output the tracked signal;

a voltage reference and loop compensation unit, adapted to: determine an adjustment control signal according to the variation from the sampling unit and the tracked signal from the tracked signal sampling unit, and output the adjustment control signal; and a secondary Pulse Width Mediation (PWM) control Integrated Circuit (IC) and driving unit, adapted to output a PWM signal according to the adjustment control signal outputted by the voltage reference and loop compensation unit, wherein the PWM signal is used to adjust the voltage outputted by the secondary non-isolation adjusting and converting unit.

5. The power supply adjusting apparatus of claim 4, wherein the tracked signal sampling unit comprises:

a tracked signal generating unit, adapted to generate the tracked signal according to service status of the powered apparatus;

a tracked signal receiving unit, adapted to receive the tracked signal generated by the tracked signal generating unit; and a tracked signal processing and converting unit, adapted to: convert the tracked signal received by the tracked signal receiving unit to obtain a tracked signal that matches the secondary PWM controller IC and driving unit, and output the tracked signal to the voltage reference and loop compensation unit.

6. The power supply adjusting apparatus of claim 1, further comprising a current source switching unit, adapted to: receive a plurality of current source signals outputted by the primary isolation converting unit, choose one of the current source signals according to the tracked signal or the adjustment control signal outputted by the voltage adjustment controlling unit, and output the chosen current source signal to the secondary non-isolation adjusting and converting unit.

7. A power supply adjusting apparatus, comprising:

a primary isolation converting unit, connected to an input of a power supply and adapted to: convert voltage or current of an input power supply signal from the input of the power supply, and output a power supply signal that meets an expected voltage or current requirement;

a voltage adjustment controlling unit, adapted to: determine an adjustment control signal with respect to the output voltage according to an expected output voltage and a tracked signal provided by a powered apparatus, and output the adjustment control signal; and a secondary non-isolation adjusting and converting unit, connected to an output of the power supply and adapted to: adjust the power supply signal outputted by the primary isolation converting unit according to the adjustment control signal outputted by the voltage adjustment controlling unit, and output an adjusted power supply signal; and a tracked signal frequency division processing unit, adapted to divide the received tracked signal into a high frequency signal and a low frequency signal according to a preset policy, wherein the low frequency signal is sent to the voltage adjustment controlling unit; and a precise tracked voltage correcting unit, adapted to: adjust the voltage outputted by the voltage adjustment controlling unit according to the high frequency signal outputted by the tracked signal frequency division processing unit, and output the adjusted voltage.

* * * * *